Sept. 24, 1957 J. W. KLAAS 2,807,173
LOCKING DEVICE
Filed Oct. 21, 1952
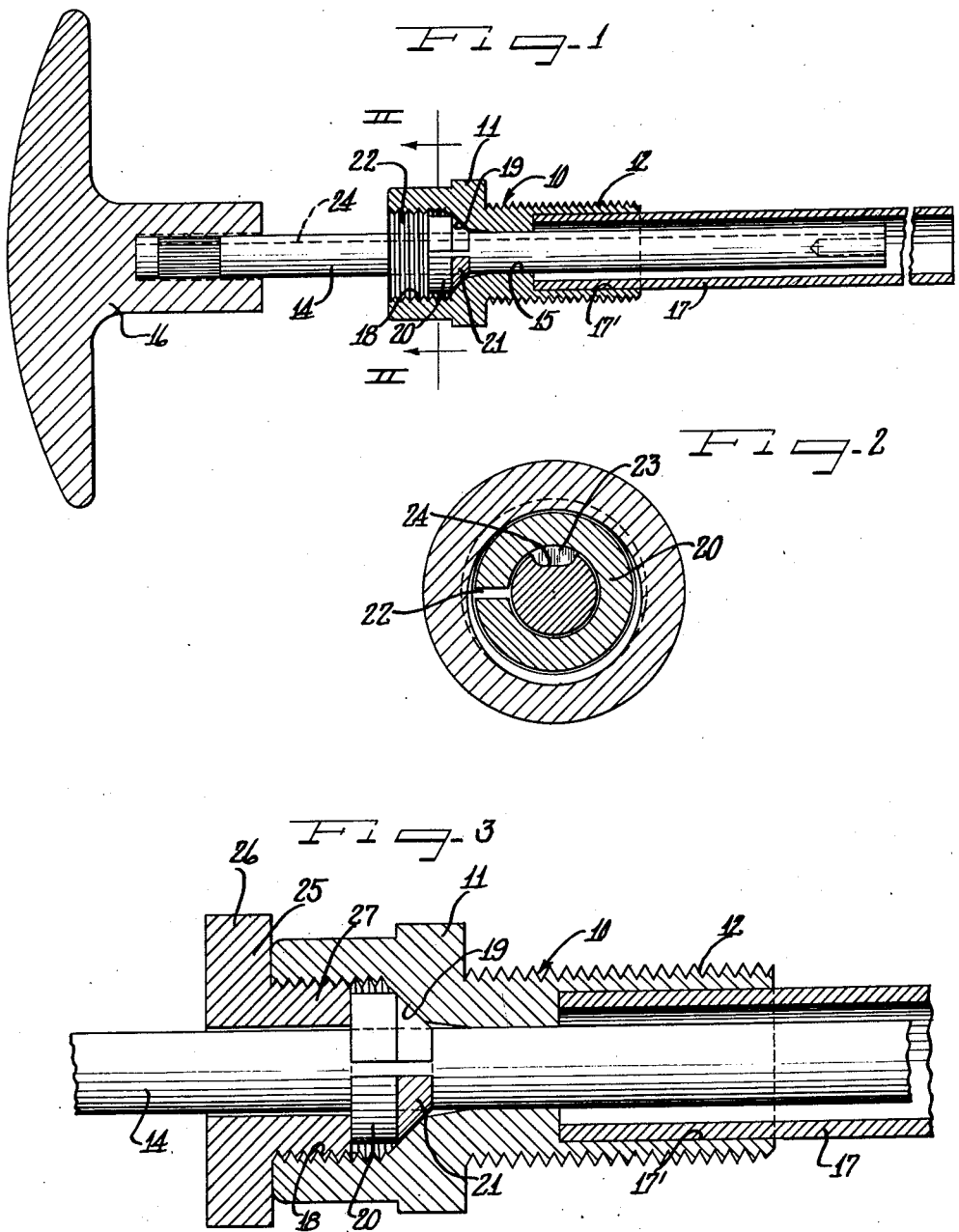
Inventor
John W. Klaas

United States Patent Office 2,807,173
Patented Sept. 24, 1957

2,807,173

LOCKING DEVICE

John W. Klaas, Chicago, Ill., assignor to Albert L. Coulter, Chicago, Ill.

Application October 21, 1952, Serial No. 316,024

5 Claims. (Cl. 74—503)

This invention relates to a locking device and more particularly to a locking device arranged to frictionally retard rotation or longitudinal movement of a shaft or the like.

The locking device of this invention is particularly advantageous when used to frictionally retard longitudinal movement of manually actuatable control rods or shafts such as those used for controlling the throttle or choke in automobiles and aircraft although it will be understood that the device has general application and is not limited to any particular use.

According to this invention, the control rod or shaft has a portion disposed within an opening in a support member, an internal annular beveled shoulder being provided within the opening, a split ring of resilient material being disposed on the shaft portion within the opening and having a beveled end face complementary to the beveled shoulder, and means being provided for urging the beveled end of the split ring into camming engagement with the beveled shoulder to compress the split ring into clamping engagement with the shaft portion to lock against or frictionally retard either rotation or longitudinal movement of the shaft portion. With this structure, the shaft may be securely locked against either rotation or longitudinal movement or a desired uniform frictional resistance to rotation or longitudinal movement may be achieved.

According to a particular feature of this invention, the means for urging the beveled end of the split ring into camming engagement with the beveled shoulder takes the form of an externally threaded sleeve disposed on the shaft and threaded within the opening in the support member so as to be movable into engagement with the split ring and move the beveled end face of the split ring toward the beveled shoulder within the opening.

While any desired materials may be used, there is a distinct advantage in making the split ring and the sleeve of unlike materials having a low coefficient of friction therebetween so that rotation of either one will not cause rotation of the other. The split ring may, for example, be of a ferrous material with the sleeve of a non-ferrous material and preferably the split ring is of spring steel with the sleeve of brass or a similar material.

According to still another feature of this invention, the sleeve is keyed to the shaft so that rotation of the shaft will control the locking engagement between the split ring and the shaft while the shaft is movable longitudinally relative to the sleeve.

A still further feature of this invention is in the provision of a manually actuatable knob portion on the sleeve disposed outside of the support member for controlling the frictional inter-engagement between the split ring and the shaft.

The object of the invention, accordingly, is to provide improved locking devices utilizing a split ring urged into clamping engagement with a control rod or shaft to frictionally resist against rotation or longitudinal movement thereof.

This invention contemplates other objects, features and advantages which will become more fully apparent from the following detailed description taken in conjunction with the accompanying drawings which illustrate preferred embodiments and in which:

Figure 1 is a longitudinal section through one preferred type of control device constructed according to the principles of this invention;

Figure 2 is a cross-sectional view taken substantially along lines II—II of Figure 1; and Figure 3 is a longitudinally sectional view similar to Figure 1 and illustrating another preferred locking device constructed according to the principles of this invention.

Reference numeral 10 designates a support member which may preferably be arranged for attachment to a panel with a head 11 at one end arranged to abut the panel and with an externally threaded portion 12 at the other end for receiving a nut to secure the member 10 to the panel. A shaft 14 extends through a central longitudinal opening 15 in the support member 10 and has a manually actuatable handle 16 secured, as by a drive fit, to the outer end thereof, the inner end of the shaft 14 being adapted for connection to a Bowden wire or a like control device. The opening 15 has a counterbore 17' at its inner end for receiving a tubular housing 17 which may fixedly support one end of the outer housing of a Bowden wire connector. Adjacent the outer end thereof, the opening 15 has an internally threaded counterbore 18 terminated at its inner end by an internal annular beveled shoulder 19. A split ring 20 of resilient material, preferably steel, is disposed on the shaft 14 within the opening 18 and has a beveled end face 21 complementary to the beveled shoulder 19.

Means are provided for urging the split ring 20 toward the shoulder 19 to effect a camming inter-engagement between the shoulder 19 and the beveled face 21 and compress the split ring into clamping and frictional engagement with the shaft 14. For this purpose, an externally threaded sleeve 22 is disposed around the shaft 14 and is threaded within the internally threaded counterbore 18 so as to be engageable with the split ring 20 upon rotation thereof.

The sleeve 22 is preferably provided with a radially inwardly projecting key portion 23, which rides in a longitudinal slot 24 in the shaft 14. By rotation of the shaft 14 the sleeve 22 is rotated so as to control the frictional interengagement between the split ring 20 and the shaft 14. At the same time, the shaft 14 is freely movable longitudinally with respect to the sleeve 22.

According to a specific feature of this invention, the split ring 20 and the externally threaded bushing or sleeve 22 are made of dissimilar materials having a lower coefficient friction therebetween so that rotation of the bushing 22 will not tend to rotate the split ring 20 but only cause longitudinal movement thereof with a uniform clamping engagement between the internal generally cylindrical surface of the split ring 20 and the shaft 14.

The device thus far described has been found to give extremely good results in practice. In particular, only a slight angular rotation of the shaft 14 is necessary to move the split ring between completely unlocked relation to the shaft 14 to a position in which the shaft 14 is securely held against longitudinal movement. The exact amount of angular movement required depends, of course, upon the pitch of the threads, the angle of the beveled shoulder and the resiliency of the split ring 20 but a quarter turn or less is ordinarily all that is required. In addition, the frictional resistance to movement of the shaft 14 is very uniform. The exact reason for this is not known but it is apparently due to the fact that the ring does not rotate and has an internal generally cylindrical surface uniformly engaging the outer cylindrical surface of the shaft 14.

Another preferred embodiment of the invention is illustrated in Figure 3 which is substantially identical to that of Figures 1 and 2 described above except that a locking control member 25 which is manually actuatable independently of control shaft movement is substituted for the control sleeve or bushing 22 described above. This member 25 has a head portion 26 disposed outside the support member 12 for manual actuation and has an externally threaded shank portion 27 threaded within the internally threaded counterbore 18 and movable into engagement with the split ring 20 on rotation thereof. By this construction, the frictional resistance to either longitudinal movement or rotation of the shaft 14 may be controlled independently of the position thereof. Further, as in the case with the embodiment described above, the frictional resistance to movement is very uniform.

As is also the case with the member 22 described above, the locking control member 25 may be of a material unlike the material of the split ring 20. This is highly advantageous with this particular embodiment since even if the split ring 20 should be rotated by rotation of the shaft 14, the locking control member 25 is not rotated and the condition of the locking member and the frictional resistance to either rotation or longitudinal movement of the shaft 14 is not changed.

Any desired materials may be used but a split ring of spring steel and a locking control member of either brass or bronze have been found to be highly satisfactory.

It will be understood that modifications and variations may be effected without departing from the spirit and scope of the novel concepts of the present invention.

I claim as my invention:

1. A locking device, comprising: a support member having an opening therein and an internal annular beveled shoulder within said opening, a shaft having a portion disposed within said opening, a split ring of resilient material disposed on said shaft portion within said opening and having a beveled end complementary to said beveled shoulder, and an externally threaded sleeve on said shaft threaded within said support member and arranged for engaging said split ring for urging said beveled end into camming engagement with said shoulder to compress said split ring into clamping engagement with said shaft portion, said split ring and said sleeve being of unlike materials having a low coefficient of friction therebetween.

2. A locking device, comprising: a support member having an opening therein and an internal annular beveled shoulder within said opening, a shaft having a portion disposed within said opening, a split ring of resilient material disposed on said shaft portion within said opening and having a beveled end complementary to said beveled shoulder, and an externally threaded sleeve keyed on said shaft for rotation therewith and threaded within said support member and arranged for engaging said split ring for urging said beveled end into camming engagement with said shoulder to compress said split ring into clamping engagement with said shaft portion to frictionally lock said shaft portion against longitudinal movement, said split ring and said sleeve being of unlike materials having a low coefficient of friction therebetween.

3. A locking device, comprising: a support member having an opening therein and an internal annular beveled shoulder within said opening, a shaft having a portion disposed within said opening, a split ring of resilient material disposed on said shaft portion within said opening and having a beveled end complementary to said beveled shoulder, and an externally threaded sleeve on said shaft threaded within said support member and arranged for engaging said split ring for urging said beveled end into camming engagement with said shoulder to compress said split ring into clamping engagement with said shaft portion, said sleeve having a manually actuatable head portion outside of said member for adjusting the amount of friction between said shaft and said split ring, and said split ring and said sleeve being of unlike materials having a low coefficient of friction therebetween.

4. In a locking device, a support member arranged for attachment to a panel with an enlarged head portion at one end thereof and with an externally threaded portion at the other end thereof for receiving a nut to cooperate with the enlarged head portion and securing the member to the panel, said member having a central longitudinal opening therethrough with a first counterbore at the inner end thereof for receiving a connector housing and with an internally threaded counterbore at the outer end thereof terminated at its inner end by an internal annular beveled shoulder, a shaft extending through said longitudinal opening, a handle secured to the end of said shaft outside said one end of said member, a split ring on said shaft having a beveled end face complementary to said beveled shoulder, and an externally threaded sleeve on said shaft threaded within said internally threaded counterbore and engaged with said split ring for urging said beveled end face into camming engagement with said shoulder to compress said split ring into clamping engagement with said shaft to fixedly lock said shaft against longitudinal movement.

5. A locking device, comprising: a support member having an opening therein and an internal annular beveled shoulder within said opening, a shaft having a portion disposed within said opening, a split ring of resilient material disposed on said shaft portion within said opening and having a beveled end complementary to said beveled shoulder, and an externally threaded sleeve on said shaft threaded within said support member and arranged for engaging said split ring for urging said beveled end into camming engagement with said shoulder to compress said split ring into clamping engagement with said shaft portion, the engaging surfaces of said sleeve and said split ring being in planes transverse to the axis of rotation of said sleeve.

References Cited in the file of this patent

UNITED STATES PATENTS

| | | |
|---|---|---|
| 1,429,940 | Field | Sept. 26, 1922 |
| 1,478,389 | Harrington | Dec. 25, 1923 |
| 1,488,292 | Schonfield | Mar. 25, 1924 |
| 1,601,976 | Mayer | Oct. 5, 1926 |
| 1,637,383 | Livergood | Aug. 2, 1927 |
| 1,907,577 | Potter | May 9, 1933 |
| 2,112,722 | Weber | Mar. 29, 1938 |
| 2,273,334 | Shakespeare | Feb. 17, 1942 |
| 2,309,502 | Douglas | Jan. 26, 1943 |

FOREIGN PATENTS

| | | |
|---|---|---|
| 937,384 | France | Mar. 8, 1948 |